United States Patent Office 3,200,121
Patented Aug. 10, 1965

3,200,121
DISUBSTITUTED-ALKANOYL HYDRAZIDES OF 1-AMINOPIPERAZINES
Calvin H. Lovell, Morton Grove, Ill., assignor to G. D. Searle & Co., Chicago, Ill., a corporation of Delaware
No Drawing. Filed Aug. 5, 1964, Ser. No. 387,805
10 Claims. (Cl. 260—268)

The present application is a continuation-in-part of application Serial No. 218,850, filed August 23, 1962, and now abandoned.

The present invention relates to a group of hydrazides of 4-substituted 1-aminopiperazines wherein the acid portion is an alkanoic acid having at least two cyclic substituents. In particular, the present invention relates to a group of compounds having the following general formula

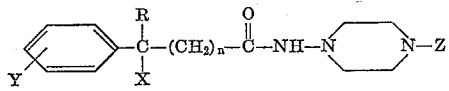

wherein $n$ is a whole number between 0 and 1 inclusive; R is selected from the group consisting of hydrogen and lower alkyl; Y is selected from the group consisting of hydrogen and halogen; X is selected from the group consisting of cyclopentyl, cyclohexyl, phenyl, benzyl, and benzhydryl; and Z is selected from the group consisting of lower alkyl, hydroxy(lower alkyl), benzyl, ar-methylbenzyl, ar-methoxybenzyl, and ar-halobenzyl.

The lower alkyl radicals referred to above contain up to 6 carbon atoms and are exemplified by radicals such as methyl, ethyl, propyl, and butyl. Likewise, the hydroxy(lower alkyl) radicals referred to above contain up to 6 carbon atoms. Examples of such radicals are 2-hydroxyethyl, 3-hydroxypropyl, and 4-hydroxybutyl. The halogen or halo substituents referred to above include fluorine, chlorine, bromine, and iodine.

The symbol "ar" used as a prefix in a number of the radicals referred to above indicates that the substituent therein is attached to the aromatic portion of the radical involved. Thus, ar-methylbenzyl would encompass 2-methylbenzyl, 3-methylbenzyl, and 4-methylbenzyl.

Also encompassed by this invention are the non-toxic salts of the aforementioned organic bases, as exemplified by the hydrochloride, hydrobromide, hydroiodide, tartrate, succinate, maleate, malate, acetate, citrate, ascorbate, nitrate, sulfate, phosphate, and sulfamate.

The compounds of the present invention are conveniently prepared by heating the appropriate acid halide, preferably the acid chloride, with a 4-substituted 1-aminopiperazine. The reaction is preferably carried out in an inert solvent such as toluene or chloroform, although other inert solvents are equally suitable.

The 4-substituted 1-aminopiperazines are conveniently prepared by reduction, preferably with lithium aluminum hydride, of the corresponding 4-substituted 1-nitrosopiperazine. The nitroso compound is available either from nitrosation of the appropriate 1-substituted piperazine or from alkylation of 1-nitrosopiperazine with an alkyl halide, a benzyl halide, or a benzhydryl halide. Compounds such as benzyl chloride or benzhydryl chloride are preferred for the alkylation.

The acid chlorides referred to above are prepared by the reaction of the appropriate carboxylic acid with thionyl chloride. For example, 22.8 parts of thionyl chloride is added, with stirring, to a mixture of 30.2 parts of 2,3,3-triphenylpropionic acid, 160 parts of benzene, and 0.1 part of pyridine while the temperature is maintained at 40–50° C. The resultant mixture is heated for 5 hours and then allowed to stand at room temperature for 15 hours. Volatile materials are distilled from the mixture, fresh benzene is added to the residue, and volatile materials are again removed. The resultant residue is crude 2,3,3-triphenylpropionyl chloride and it is used directly without further purification. Other acid chlorides, such as 2,2-diphenylbutyryl chloride, α-phenyl-2-chlorophenylacetyl chloride, and α-phenyl-4-chlorophenylacetyl chloride are prepared in the same manner.

The compounds of the present invention are useful because of their pharmacological properties. In particular, the compounds possess diuretic activity. In addition, they possess anti-inflammatory activity which is demonstrated by a phenylbutazone-like effect on edematous conditions. They also possess antibiotic activity against a variety of organisms. Thus, they inhibit the growth of bacteria such as *Diplococus pneumoniae*, protozoa such as *Tetrahymena gellei*, and algae such as *Chlorella vulgaris*, and they inhibit germination of seeds of *Trifolium*.

The following examples are presented to further illustrate the present invention; they should not be construed as limiting it in spirit or in scope. In these examples, quantities are indicated in parts by weight and temperatures in degrees centigrade (° C.).

*Example 1*

To a solution of 114 parts of 1-(3-methylbenzyl)-piperazine in 350 parts of water and 125 parts of concentrated hydrochloric acid there is added, with stirring, a solution of 43 parts of sodium nitrate in 100 parts of water. The resultant mixture is stirred at 50° C. for 3 hours, it is made alkaline with potassium carbonate and potassium hydroxide solution, and it is then extracted with chloroform. The resultant organic solution is dried and treated with charcoal and the solvent is evaporated under reduced pressure to give an oil which is 1-(3-methybenzyl)-4-nitrosopiperazine.

If equivalent quantities of the appropriate piperazine are substituted for the 1-(3-methylbenzyl)piperazine and the above procedure is repeated, the following compounds are obtained:

1-ethyl-4-nitrosopiperazine
1-(2-hydroxyethyl)-4-nitrosopiperazine
1-(4-hydroxybutyl)-4-nitrosopiperazine
1-(4-methylbenzyl)piperazine

*Example 2*

To a mixture of 58 parts of 1-nitrosopiperazine and 70 parts of potassium carbonate in 400 parts of 2-butanone there is added, with stirring, a solution of 81 parts of 4-chlorobenzyl chloride in 160 parts of 2-butanone. The resultant mixture is stirred for 16 hours, 5 parts of sodium iodide is added, and the mixture is refluxed for 4 hours. The resultant mixture is then filtered and the solvent is evaporated from the filtrate to leave an oil which crystallizes on standing. This product is 1-(4-chlorobenzyl)-4-nitrosopiperazine.

Equivalent quantities of the appropriate benzyl chloride are substituted for the 4-chlorobenzyl chloride and the above procedure is repeated. The following compounds are obtained in this way:

1-(4-methoxybenzyl)-4-nitrosopiperazine
1-(3-fluorobenzyl)-4-nitrosopiperazine
1-(4-bromobenzyl)-4-nitrosopiperazine

*Example 3*

To a solution of 15.5 parts of lithium aluminum hydride in 1060 parts of ether there is added, with stirring, a solution of 85 parts of 1-(3-methylbenzyl)-4-nitrosopiperazine in 210 parts of ether. The resultant mixture is refluxed for 2 hours and then stirred at room temperature for 16 hours before it is decomposed by the successive addition of 16 parts of water, 12.2 parts of 20% aqueous sodium hydroxide solution, and 57 parts of water. The mixture is filtered to remove the precipitated solid and the filtrate is distilled to give 1-amino-4-(3-methylbenzyl)piperazine boiling at about 124–126° C. at 1 mm. pressure.

In a similar manner, reduction of 92 parts of 1-(4-chlorobenzyl)-4-nitrosopiperazine with 15.2 parts of lithium aluminum hydride gives 1-amino-4-(4-chlorobenzyl)-piperazine boiling at about 128–132° C. at 0.3 mm. pressure. This compound crystallizes on standing.

Likewise, reduction of 1-(4 - methylbenzyl)-4-nitrosopiperazine with lithium aluminum hydride gives 1-amino-4-(4-methylbenzyl)piperazine.

Example 4

A solution of 116 parts of 1-(4-methoxybenzyl)-4-nitrosopiperazine in 840 parts of tetrahydrofuran is added to a refluxing solution of 23 parts of lithium aluminum hydride in 1400 parts of tetrahydrofuran. When the addition is complete, the mixture is stirred for 1 hour, refluxed for 4 hours, and then stirred for 16 hours at room temperature. The product is then isolated from the reaction mixture by the procedure described in the first paragraph of Example 3 to give 1-amino-4-(4-methoxybenzyl)piperazine melting at about 74–77° C.

If the above reduction is repeated using the appropriate nitroso compound, the following compounds are obtained:

1-amino-4-ethylpiperazine.
1 - amino - 4-(2-hydroxyethyl)piperazine, melting at about 103–105° C.
1-amino-4-(4-hydroxybutyl)piperazine.
1-amino-4-(3-fluorobenzyl)piperazine.
1-amino-4-(4-bromobenzyl)piperazine.

Example 5

To a solution of 11.6 parts of 1-amino-4-methylpiperazine in 90 parts of dry toluene is added 11.5 parts of diphenylacetyl chloride in 26 parts of toluene. The resultant mixture is refluxed for 3 hours, and then allowed to stand for 16 hours. 100 parts of water, 100 parts of 1 N hydrochloric acid and 300 parts of chloroform is added to the mixture. The organic layer is separated and extracted with 100 parts of 1 N hydrochloric acid. The combined acid extracts are made alkaline with potassium carbonate and the resultant mixture is extracted with chloroform. The chloroform solution is dried and the solvent is evaporated to give N-(4-methyl-1-piperazinyl)diphenylacetamide. This compound melts at about 185–187° C. after recrystallization from ethyl acetate. It has the following formula

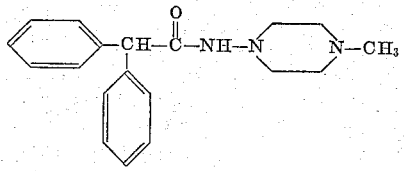

If an equivalent quantity of 1-amino-4-ethylpiperazine is substituted for the 1-amino-4-methylpiperazine and the above procedure is repeated, the product obtained is N-(4-ethyl-1-piperazinyl)diphenylacetamide.

Example 6

A solution of 13.2 parts of α-phenyl-4-chlorophenylacetyl chloride in 45 parts of toluene is added, with stirring, to a solution of 11.5 parts of 1-amino-4-methylpiperazine in 90 parts of toluene. Stirring is continued as the mixture is first allowed to come to 25° C., is then heated to 80° C. for 1 hour, and finally cooled again to 25° C. The resultant mixture is then mixed with water and the organic layer is separated and extracted twice with 1 N hydrochloric acid. The combined acid extracts are washed with ether and then made alkaline with potassium hydroxide. The oily residue which forms is extracted into ether and the ether solution is then dried over potassium carbonate, treated with charcoal, and concentrated to dryness. The crude product thus obtained is crystallized from ethyl acetate to give N-(4-methyl-1-piperazinyl)-α-phenyl-4-chlorophenylacetamide melting at about 123–125° C.

Example 7

To a solution of 11.5 parts of 1-amino-4-methylpiperazine in 90 parts of toluene there is added, with stirring, a solution of 12.2 parts of 3,3-diphenylpropionyl chloride in 45 parts of toluene. The exothermic reaction which ensues is allowed to subside before the mixture is heated at 80° C. for 2 hours and then allowed to stand for 16 hours. The mixture is filtered and the filtrate is washed with water and then extracted with 2 portions of 1 N hydrochloric acid. The acid extract is first washed with ether before it is made alkaline with potassium hydroxide. The oily material which forms is extracted into chloroform and the chloroform solution is dried over potassium carbonate and treated with charcoal. Evaporation of the solvent leaves an oil which solidifies when triturated with pentane. The solid thus obtained is recrystallized from a mixture of ethyl acetate and pentane to give N-(4-methyl-1-piperazinyl)-3,3-diphenylpropionamide melting at about 149–151° C.

Example 8

12.3 parts of 2,3-diphenylpropionyl chloride is reacted with 11.5 parts of 1-amino-4-methylpiperazine according to the procedure described in Example 7. The crude product is recrystallized from ethyl acetate to give N-(4-methyl-1-piperazinyl)-2,3-diphenylpropionamide melting at about 125–128° C.

Example 9

To a stirred solution of 11.5 parts of 1-amino-4-methylpiperazine in 90 parts of toluene there is added, with stirring, a solution of 13 parts of 2,2-diphenylbutyryl chloride in 50 parts of toluene. During the addition of the acid chloride, 75 parts of methylene chloride is added to the reaction mixture to facilitate stirring. The mixture is then stirred at 25° C. for 3.5 hours and filtered. When the filtrate is extracted with 1 N hydrochloric acid, a precipitate forms. This solid is separated by filtration and then suspended in an aqueous solution of excess potassium carbonate and potassium hydroxide. The resultant alkaline mixture is extracted with ether and the separated organic layer is dried over potassium carbonate. Evaporation of the solvent from the dried solution leaves a residual oil which is crystallized from a mixture of ethyl acetate and hexane to give N-(4-methyl-1-piperazinyl)-2,2-diphenylbutyramide melting at about 89–92° C.

Example 10

To a solution of 11.6 parts of 1-amino-4-(2-hydroxyethyl)piperazine in 130 parts of toluene and 60 parts of chloroform is added a solution of 9.2 parts of diphenylacetyl chloride in 45 parts of toluene. The resultant mixture is refluxed for 3 hours and filtered, and the filtrate is extracted with 1 N hydrochloric acid. The precipitate which had been separated by filtration is also dissolved in 1 N hydrochloric acid and combined with the acid extract of the organic solution. The resultant acid solution is made alkaline with potassium carbonate and the free amine which precipitates is separated by filtration, dried, and crystallized from ethyl acetate to give 1-diphenylacetamido-4-(2-hydroxyethyl)piperazine, melting at about 133–135° C. This compound has the following formula

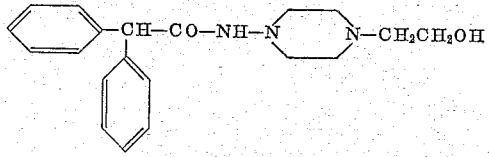

If an equivalent quantity of 1-amino-4-(4-hydroxybutyl)piperazine is substituted for the 1-amino-4-(2-hydroxyethyl)piperazine and the above procedure is repeated, the product obtained is 1-diphenylacetamido-4-(4-hydroxybutyl)piperazine.

Example 11

A solution of 26.4 parts of α-phenyl-2-chlorophenylacetyl chloride in 95 parts of methylene chloride is added, with stirring and cooling, to a solution of 14.5 parts of 1-amino-4-(2-hydroxyethyl)piperazine and 10.1 parts of triethylamine in 450 parts of chloroform. The mixture is allowed to cool to 25° C. before it is refluxed for 30 minutes and then allowed to stand for 15 hours. The resultant solution is concentrated under reduced pressure and the concentrated residue is dissolved in 1 N hydrochloric acid and washed with ether. The acid solution is then made alkaline with potassium hydroxide solution and extracted with chloroform. The chloroform solution is extracted with 2 portions of 1 N acetic acid and the combined acid extracts are made alkaline with potassium hydroxide solution and extracted with a 20% chloroform-ether mixture. The resultant organic extract is dried over potassium carbonate and the solvent is evaporated to leave a residual oil which solidifies on standing. Crystallization of this solid from ethyl acetate gives 1-(α-phenyl-2-chlorophenylacetamido)-4-(2-hydroxyethyl)piperazine melting at about 142–144° C. with decomposition.

Example 12

To a refluxing solution of 14.5 parts of 1-amino-4-(2-hydroxyethyl)piperazine in 200 parts of methylene chloride is added a solution of 26.4 parts of α-phenyl-4-chlorophenylacetyl chloride in 67 parts of methylene chloride. After the addition is complete, the mixture is stirred for 1 hour and then allowed to stand at room temperature for 15 hours. The resultant mixture is filtered and the filtrate is concentrated under reduced pressure to leave a crude residue which is crystallized twice from ethyl acetate to give 1-(α-phenyl-4-chlorophenylacetamido)-4-(2-hydroxyethyl)piperazine melting at about 154–156° C.

Example 13

To a solution of 5 parts of triethylamine and 7.3 parts of 1-amino-4-(2-hydroxyethyl)piperazine in 150 parts of chloroform there is added, with stirring, 11.8 parts of α-cyclohexylphenylacetyl chloride in 105 parts of methylene chloride. The mixture is then stirred for 1 hour and refluxed for 1.5 hours before it is concentrated under reduced pressure to leave an oily solid as a residue. The residue is mixed with ether and an excess of 1 N hydrochloric acid and the aqueous layer is separated, made alkaline with a mixture of potassium carbonate and potassium hydroxide, and extracted with chloroform. The chloroform solution is dried and the solvent is evaporated to leave a residual crude product which is dissolved in a mixture of 80 parts of ethanol, 1.1 parts of potassium hydroxide and 10 parts of water. The resultant mixture is refluxed for 2 hours and then concentrated under reduced pressure to give an oily residue. The residue is poured into 100 parts of cold water containing 5 parts of potassium hydroxide. The suspension which results is extracted with chloroform and the chloroform solution is dried and concentrated under reduced pressure to give 1-(α-cyclohexylphenylacetamido)-4-(2-hydroxyethyl)piperazine. This compound melts at about 162–164° C. after crystallization from ethyl acetate.

The free base obtained above is converted to the corresponding hydrochloride salt by mixing a 2-propanol solution of this material with an excess of 2-propanol saturated with hydrogen chloride. Ether is added to precipitate the crude salt which is then separated, dried under reduced pressure, and recrystallized from anhydrous ethanol to give 1-(α-cyclohexylphenylacetamido)-4-(2-hydroxyethyl)piperazine hydrochloride melting at about 221–223° C. The free base of this compound has the following formula

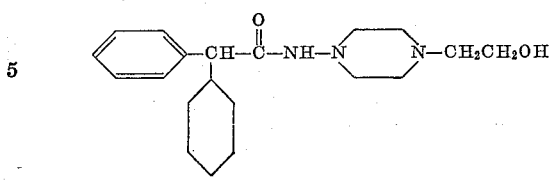

Example 14

To a solution of 10.1 parts of triethylamine and 7.3 parts of 1-amino-4-(2-hydroxyethyl)piperazine in 100 parts of chloroform is added a solution of 22.2 parts of α-cyclopentylphenylacetyl chloride in 67 parts of methylene chloride. When the addition is complete, the resultant solution is refluxed for 40 minutes, cooled to room temperature, and then concentrated under reduced pressure. The residue is partitioned between ether and an aqueous solution of excess potassium carbonate. The organic layer is separated, washed with water, and then extracted with 1 N hydrochloric acid. The combined acid extract is made alkaline with solid potassium carbonate and then extracted with ether. The ether extract is dried over potassium carbonate and treated with charcoal and the resultant solution is concentrated to dryness to leave a residue which is a mixture of hydrazide and ester-hydrazide.

20 parts of this mixture is dissolved in 95 parts of ethanol and mixed with a solution of 2.8 parts of potassium hydroxide in 20 parts of water. The resultant solution is stirred at room temperature for 5.5 hours and then refluxed for 2.5 hours before it is allowed to stand at room temperature for 15 hours. The resultant solution is concentrated under reduced pressure, the concentrate is diluted with 600 parts of water, 20 parts of potassium carbonate is added, and the mixture is extracted first with ether and then with chloroform. The combined organic extract is dried and then concentrated to leave a crude solid which is then recrystallized from ethyl acetate to give 1-(α-cyclopentylphenylacetimido) - 4 - (2 - hydroxyethyl)piperazine melting at about 131–133° C.

Example 15

A solution of 24.4 parts of 2,2-diphenylpropionyl chloride in 67 parts of methylene chloride is added, with stirring and cooling, to a solution of 10.1 parts of triethylamine and 7.2 parts of 1-amino-4-(2-hydroxyethyl)piperazine in 150 parts of chloroform. The resultant solution is stirred for one hour, refluxed for 2 hours, and then allowed to stand at room temperature for 15 hours. The solution is concentrated under reduced pressure and a solid separates; ether is added to dilute the mixture and the solid is separated by filtration. The filtrate is extracted with 1 N hydrochloric acid and the insoluble hydrochloride which precipitates is separated by filtration and then suspended in an aqueous solution of excess potassium carbonate. The basic solution is extracted with several portions of ether containing 10% chloroform and the combined extracts are dried and treated with charcoal and the solvent is evaporated under reduced pressure. The residual solid is treated with alcoholic alkali according to the procedure described in Example 14 except for the fact that the mixture is refluxed for 5 hours. The product thus obtained is crystallized from ethyl acetate to give 1-(2,2-diphenylpropionamido)-4-(-2-hydroxyethyl)piperazine melting at about 130–131° C. This compound has the following formula

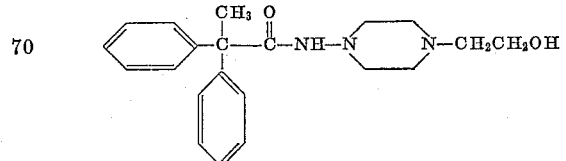

Example 16

To a solution of 14.5 parts of 1-amino-4-(2-hydroxyethyl)piperazine and 10.1 parts of triethylamine in 450 parts of chloroform is added, with stirring and cooling, 32 parts of 2,3,3-triphenylpropionyl chloride dissolved in 30 parts of methylene chloride. When the addition is complete the solution is stirred at 25° C. for 3.5 hours, refluxed for 1.5 hours, and then allowed to stand for 16 hours. The solvent is evaporated under reduced pressure and the residue is partitioned between ether and 0.4 N hydrochloric acid. The aqueous layer is separated and mixed with 10 parts of hydrochloric acid. When the resultant acid solution is cooled, a crystalline precipitate forms. This is separated by filtration and suspended in 1000 parts of water which is made alkaline by the addition of excess potassium carbonate and potassium hydroxide. The resultant suspension is extracted thoroughly with chloroform and the combined chloroform extracts are dried over potassium carbonate and concentrated to give the crude free base. This is recrystallized from acetonitrile to give 1-(2,3,3-triphenylpropionamido)-4-(2-hydroxyethyl)piperazine melting at about 220–223° C. with decomposition.

Example 17

A solution of 9.2 parts of diphenylacetyl chloride in toluene is added to a solution of 16.4 parts of 1-amino-4-(3-methylbenzyl)piperazine in dry toluene. The resultant mixture is refluxed for 5 hours. The mixture is filtered to remove the precipitate which is combined with an acid extract of the filtrate. Solid potassium carbonate (enough to alkalize the solution) is added to the aqueous suspension and the resultant mixture is extracted with chloroform. The solvent is evaporated from the dry chloroform solution to give 1-diphenylacetamido-4-(3-methylbenzyl)piperazine melting at about 140–141° C. after recrystallization from 2-propanol. This compound has the formula

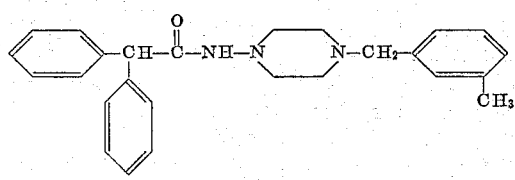

Example 18

If an equivalent quantity of the appropriate substituted 1-amino-4-benzylpiperazine is substituted for the 1-amino-4-(3-methylbenzyl)piperazine and the procedure of Example 17 is repeated, the following compounds are obtained:

1-diphenylacetamido-4-benzylpiperazine
1-diphenylacetamido-4-(4-methylbenzyl)piperazine
1-diphenylacetamido-4-(4-chlorobenzyl)piperazine
1-diphenylacetamido-4-(4-methoxybenzyl)piperazine
1-diphenylacetamido-4-(3-fluorobenzyl)piperazine

What is claimed is:
1. A compound of the formula

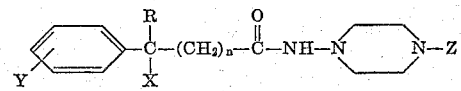

wherein $n$ is a whole number between 0 and 1 inclusive; R is selected from the group consisting of hydrogen and lower alkyl; Y is selected from the group consisting of hydrogen and chlorine; X is selected from the group consisting of cyclopentyl, cyclohexyl, phenyl, benzyl, and benzhydryl; and Z is selected from the group consisting of lower alkyl, hydroxy (lower alkyl), benzyl,

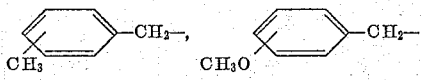

and

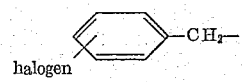

2. A compound of the formula

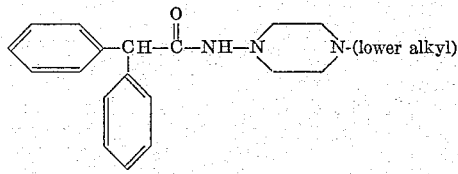

3. N-(4-methyl-1-piperazinyl)diphenylacetamide.
4. N-(4 - methyl - 1 - piperazinyl)-α-phenyl-4-chlorophenylacetamide.
5. A compound of the formula

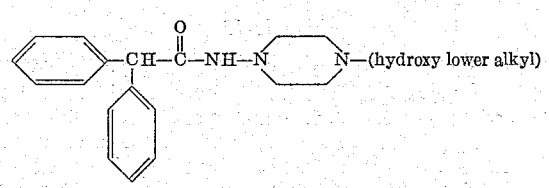

6. 1-diphenylacetamido-4-(2-hydroxyethyl)piperazine.
7. A compound of the formula

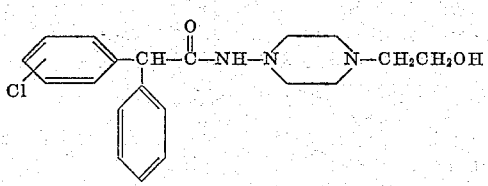

8. 1 - (α-phenyl - 4 - chlorophenylacetamido) - 4 - (2-hydroxyethyl)piperazine.
9. A compound of the formula

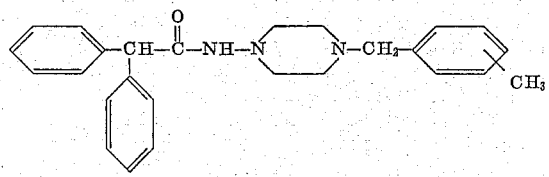

10. 1 - diphenylametamido - 4 - (3 - methylbenzyl)piperazine.

No references cited.

NICHOLAS S. RIZZO, *Primary Examiner.*